United States Patent [19]

Wachter

[11] Patent Number: 4,721,597

[45] Date of Patent: Jan. 26, 1988

[54] METHOD AND APPARATUS FOR COMPACTING SPENT NUCLEAR REACTOR FUEL RODS

[75] Inventor: William J. Wachter, Wexford, Pa.

[73] Assignee: U.S. Tool & Die, Allison Park, Pa.

[21] Appl. No.: 775,534

[22] Filed: Sep. 13, 1985

Related U.S. Application Data

[63] Continuation-in-part of Ser. No. 291,230, Aug. 10, 1981.

[51] Int. Cl.$^4$ ............................................. G21C 19/10
[52] U.S. Cl. .................................... 376/261; 376/272; 29/400 N; 29/426.3; 29/426.4; 29/426.5; 228/156; 294/906
[58] Field of Search ...................... 376/272, 260, 261; 294/906, 86.1; 254/134.3 R; 29/400 N, 723, 426.1, 426.3, 426.4, 426.5, DIG. 48; 228/156; 219/127; 414/146

[56] References Cited

U.S. PATENT DOCUMENTS

| | | | |
|---|---|---|---|
| 2,154,654 | 4/1939 | Armentrout et al. | 294/86.1 |
| 2,218,131 | 10/1940 | Gipson et al. | 294/86.1 |
| 3,464,609 | 9/1969 | Murphy | 225/97 |
| 3,904,048 | 9/1975 | Van Santen et al. | 376/271 |
| 4,062,485 | 12/1977 | Anderson | 294/86.1 |
| 4,106,177 | 8/1978 | Beard et al. | 29/726 |
| 4,312,124 | 1/1982 | Calhoun | 29/726 |
| 4,374,801 | 2/1983 | Albin | 376/271 |
| 4,441,242 | 4/1984 | Hicken et al. | 376/261 |
| 4,488,747 | 12/1984 | Austin | 294/86.1 |

Primary Examiner—Deborah L. Kyle
Assistant Examiner—Daniel Wasil
Attorney, Agent, or Firm—Thomas H. Murray; Clifford A. Poff

[57] ABSTRACT

A method and apparatus for withdrawing spent fuel rods from a nuclear fuel rod assembly into a different nuclear fuel rod container wherein the spent fuel rods have a higher fuel rod density, whereby a greater number of spent fuel rods can be stored in a water storage pool. The individual rods are drawn upwardly through a transition funnel from the fuel rod assembly into a fuel rod container. Individual pulling elements extend through the fuel rod container and through the transition funnel. The pulling members each includes a renewable metal cap and an electrode for welding the cap to the top end of an individual fuel rod within a fuel rod assembly. All of the fuel rods are withdrawn concurrently and are merged toward one another into a tighter array within the fuel rod container.

11 Claims, 6 Drawing Figures

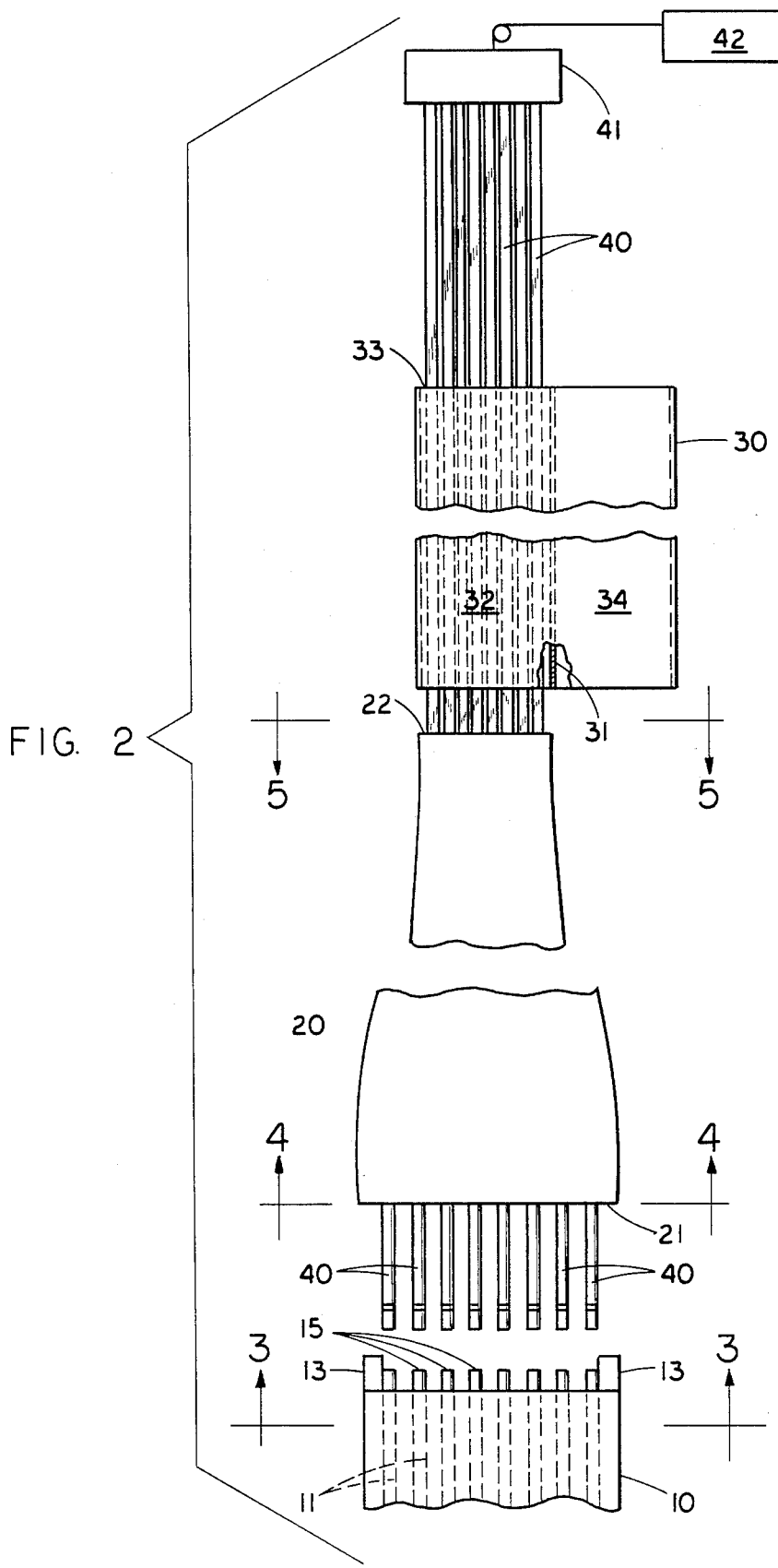

METHOD AND APPARATUS FOR COMPACTING SPENT NUCLEAR REACTOR FUEL RODS

CROSS REFERENCE TO RELATED PATENT APPLICATION

This application is a continuation-in-part of application Ser. No. 291,230 Filed Aug. 10, 1981.

FIELD OF THE INVENTION

This invention relates to a method and apparatus for compacting spent nuclear reactor fuel rods and more particularly for preparing such spent fuel rods for long-term water pool storage.

STATEMENT OF PRIOR ART

Nuclear reactor installations employ nuclear fuel materials in the form of fuel rods which are supported in fuel rod assemblies. The fuel rods are metal pipes which are filled with nuclear fuel material and are about 0.4–0.6 inch in diameter and from 8 to 15 feet in length. Groups of 64, 128, 220 or more such fuel rods are assembled in a fuel rod assembly which includes grids for alignment and support of the fuel rods, a lower end fitting, an upper end fitting, and guide tubes. The fuel rod assembly is introduced into a nuclear reactor as the fuel source. After the nuclear fuel in the fuel rod assembly is spent to a pre-established level, the entire fuel rod assembly is withdrawn from the nuclear reactor and is stored vertically in appropriate metal racks in a wet pool until the radioactive properties have dissipated sufficiently for transfer to other storage locations.

Within the fuel rod assembly, the individual fuel rods are spaced-apart in a pre-established array, usually a rectangular array. The fuel rod assemblies are spaced-apart in the array and are maintained under water in the reactor for the purpose of moderating or slowing the neutrons. In the fuel rod assembly, the ratio of cross-sectional area of fuel rod to cross-sectional area of water is approximately 1:1.

At the present time, spent nuclear fuel rod assemblies are withdrawn from the nuclear reactors and are stored vertically in appropriate storage racks under water in storage pools without any deliberate change in the fuel rod assembly. The fuel rod storage pools are filled with the spent fuel rod assemblies whose activity has dissipated as a result of extended storage in the pool.

A number of suggestions have been made for removing long-term storage fuel rod assemblies from the pool and for withdrawing individual spent fuel rods from the fuel rod assembly and thereafter for assembling the individual spent fuel rods in new containers or canisters wherein the fuel rods are more closely aligned, i.e., more densely compacted, and for returning such newly filled canisters to appropriate storage racks within a water storage pool for long-term storage or until appropriate fuel recovery processing is economically feasible.

None of these compacting processes have been carried out except with simulated fuel rod assemblies containing simulated fuel rods. Some of the anticipated difficulties with the proposed fuel rod compacting processes which have been suggested arise from the knowledge that the actual fuel rods are twisted and bent out of alignment as a result of their long-term exposure in nuclear reactors. In some cases, the distortion may be as much as 1.5 inches in an 8-foot long rod. Such permanent distortion of the fuel rods will interfere with the proposed alignment techniques. The casing of the fuel rods is usually embrittled due to irradiation in the nuclear reactor.

A further problem is that the long, thin fuel rods are whippy and may be difficult to manipulate. A still further problem relates to the inherent safety of compacting spent fuel rods. There is a possibility that the fuel rods might become spaced-apart by a critical distance while removed from the fuel rod assembly and before compaction and confinement in a storage canister. Such possibility should be precluded.

At the present time there is a need to compact spent fuel rods which are contained in wet storage pools in the fuel rod assemblies.

STATEMENT OF THE INVENTION

According to the present invention, a method and related apparatus are proposed for transferring spent fuel rods from a fuel rod assembly in an underwater pool directly into a fuel rod canister where the density of the fuel rods greatly exceeds the fuel rod density in the fuel rod assembly. As a result of the present invention, the spent fuel storage capacity in a particular water storage pool can be approximately doubled. Moreover, the fuel rod consolidation process of the present invention is carried out without altering the relative position of the fuel rods whereby after consolidation the identity of a fuel rod is known at each position in the fuel rod canister which facilitates accounting procedures.

According to the invention, the top end of a fuel rod assembly is removed, by cutting or otherwise, and the exposed fuel rod tops are individually connected by welding to individual pulling members such as tubes or other tensioning devices. The pulling elements are presented in an array which corresponds to the array of the individual fuel rods. The pulling elements are drawn through a fuel rod directing chamber such as a transition funnel which has a relatively wide cross-section at its base corresponding to the array of the tops of the fuel rods in the fuel rod assembly. The transition funnel at its top end has a relatively narrow cross-section which corresponds to an array of fuel rods in a compact storage presentation. For each individual pulling element there is a separate guide within the transition funnel for directing the pulling element and the fuel rod which is welded thereto so as to pull the fuel rod from the fuel rod assembly through the transition funnel into a permanent storage container which is positioned above the top of the transition funnel. The pulling elements each includes welding means at their lower ends which can pass downwardly through the container and through the transition funnel. The upper ends of the pulling elements are connected to a tensioning device such as a reeling drum to permit movement of each pulling element and the associated fuel rod upwardly out of the fuel rod assembly into a selected one of the passageways through the transition funnel and thence into a pre-established position in a compacted array of fuel rods within the container.

Welding means are provided at the bottom end of each pulling element for securing one fuel rod. A preferred pulling element is a plastic tube and a preferred welding means is an arc welder, e.g., an inert gas metal-arc type welder having an electrode extending to form an arc gap with the bottom wall of a fixture that is releasably connected to the plastic tube. After the fixture is welded to the fuel rod, the fuel rod is pulled into the canister. Thereafter, the pulling element is separated from the fuel rod by breaking the weld joint or by withdrawing the plastic tube from the fixture. The upper ends of the plastic tube forming the pulling elements are connected to a wench by a cable through a manifold used to supply inert gas to the plastic tubes for the welding process.

Preferably the individual fuel rods are withdrawn upwardly concurrently from the common fuel rod assembly so that the upper ends of all of the fuel rods enter into the container at about the same level to facilitate stacking within the container. Preferably, within the container, the array of spent fuel rods is a rectangular array which provides maximum fuel rod density in the container. Preferably the fuel rod density in the container is approximately twice that of the fuel rod density in the fuel rod assembly.

The transition funnel is so arranged that the guide tubes therein merge toward one another. As a consequence, the fuel rods, in passing from the fuel rod assembly into the fuel rod container, do not move apart so that critical distances between fuel rods cannot occur. Also, since the fuel rods are advanced under tension they can be straightened in the guide tubes without breakage due to irradiation embrittlement.

By providing fuel rod containers of the same cross-sectional dimensions as the fuel rod assemblies, the containers can be stored in the same underwater fuel rod storage racks which have been employed for the fuel rod assemblies. When the present invention is practiced accordingly, the capacity of the fuel rod storage pools for spent nuclear fuel rods can be approximately doubled. The structural components of the empty fuel rod assembly are collected and stored for appropriate disposal.

Accordingly, it is an object of this invention to provide a method for transferring spent fuel rods from a fuel rod assembly directly into a compact fuel rod container for compact storage of the spent fuel rods.

It is a further object of this invention to carry out the described method without extracting the fuel rods above the surface of the water in the fuel rod storage pool in an area of the storage pool which is minimized by the fact that the fuel rods are moved unidirectionally from a fuel rod assembly and to a standard canister.

DESCRIPTION OF THE DRAWINGS

These features and advantages of the present invention as well as others will be more fully understood when the following description is read in light of the accompanying drawings, in which:

FIG. 2 is a broken, side elevational view of a fuel rod assembly, a transition funnel, a container and a tensioning device illustrating the method and apparatus of the invention;

DESCRIPTION OF THE PREFERRED EMBODIMENTS

Figure 1:
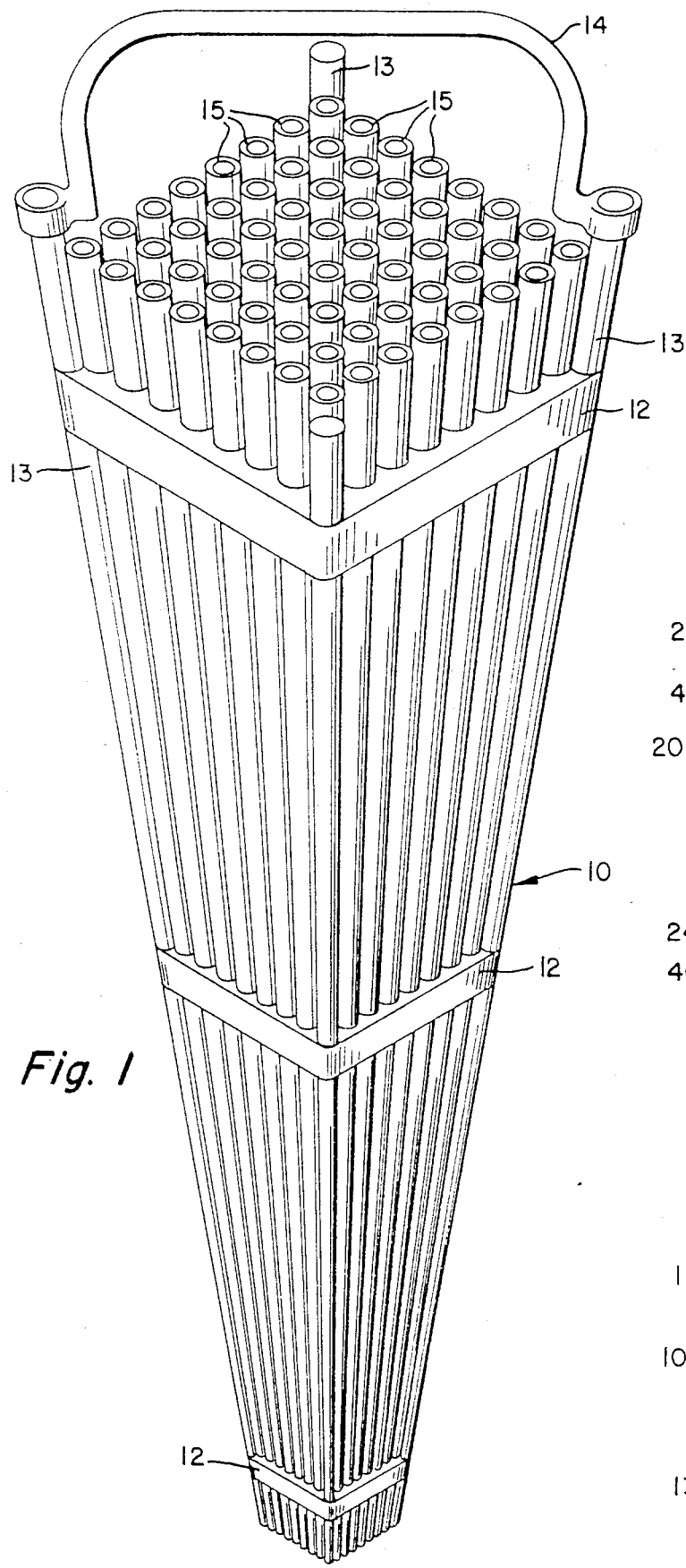
FIG. 1 is a perspective illustration of a typical fuel rod assembly.

Referring to FIG. 1, a typical fuel rod assembly 10 includes individual fuel rods 11 (64 rods are shown in FIG. 1), guide rods 13 and a handle member 14. The individual fuel rods (sometimes also called fuel pins) 11 are about 0.4–0.6 inch in diameter and about eight feet long in one type of nuclear reactor installation and the fuel rods are about 15 feet long in another type of nuclear reactor installation. The fuel rod assembly 10 is withdrawn from a nuclear reactor after the nuclear fuel within the fuel rods 11 has been spent. Thereafter, the fuel rod assembly 10 is stored in appropriate storage racks under water in storage pools until its activity is dissipated.

The purpose of the present invention is to compact the fuel rods 11 after their activity has dissipated and to store the fuel rods in a new and different container wherein their spacing is altered. The fuel rods as presented in a fuel rod assembly for use in a nuclear reactor are intended to be active in the presence of slow neutrons. The fuel rods in operation are spaced apart by predetermined distances so that released neutrons can be slowed to an effective velocity for atomic reactions. Water is an effective moderator for this purpose. As the fuel rods are brought closer together, there is insufficient water between fuel rods to retard the velocity of the neutrons. Hence the reactivity of the fuel rod assembly is reduced because the high velocity neutrons pass through the installation without sufficient retardation to cause any significant atomic collisions. Thus the reactivity is reduced as the fuel rods are brought together.

As shown in FIG. 2, a fuel rod assembly 10 initially has its upper end removed so that the top ends 15 of the individual fuel rods 11 are exposed. The upper end of the fuel assembly is removed by cutting or otherwise. One way of removing the upper end is to cut the top elements with an air-powered underwater band saw. In some fuel rod assemblies, the upper end may be dismantled by removing the bolts of other fastening devices which connect it to the main frame. After the upper end of the assembly is removed, the top ends 15 of the individual fuel rods 11 are exposed as shown in FIG. 2.

Figure 5:
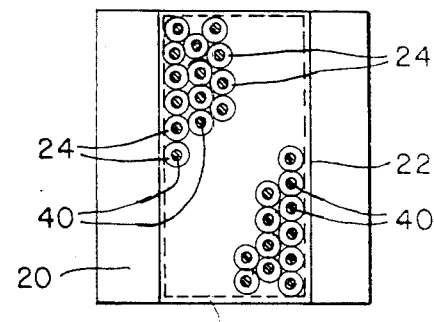
FIGS. 4 and 5 are plan views of the bottom end and top end, respectively, of the transition funnel of FIG. 2.
Figure 4:
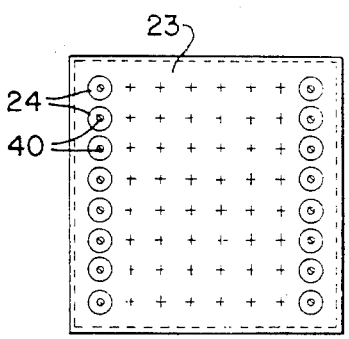
Figure 3:
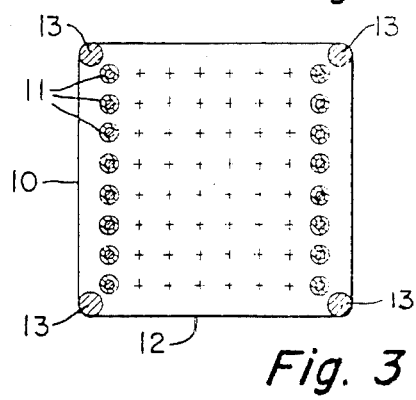
FIG. 3 is a cross-sectional view taken along the line 3—3 of FIG. 2.

As shown in FIG. 3 the spaced-apart pattern of fuel rods forms a rectangular array of fuel rods within the fuel rod assembly. Above the fuel rod assembly 10 is a transition funnel 20 which has a lower end 21 and an upper end 22. The lower end 21 as shown in FIG. 4 has a generally square grid corresponding to the cross-section of the fuel rods 11, as shown in FIG. 3. At the lower end 21 is a grid 23 having openings for individual tubes 24 corresponding in number and array with the top ends 15 of the fuel rods. The transition funnel tapers from its lower end 21 toward its upper end 22. At the upper end 22, the transition funnel 20 as shown in FIG. 5, has a grid 25 with openings for receiving the top ends of the tubes 24 in a desired array. It will be observed that the array of the tube openings 24 in the grid 25 is equilateral triangular—a preferred array.

Above the transition funnel 20 is a container 30 having outer dimensions corresponding to the outer dimensions of the fuel rod assembly 10. The container 30 preferably is a metal rectangular box having a length slightly greater than the length of the fuel rods 11 and having sufficient cross-sectional area to receive the compacted fuel rods from a fuel rod assembly 10 in approximately half of its cross-sectional area. In one embodiment, a vertical baffle is provided to divide the container 30 into parallel chambers 32, 34. All of the fuel rods 11 from the fuel rod assembly 10 can be confined in the chamber 32 as shown in FIG. 2. All of the fuel rods from another fuel rod assembly can be confined in the chamber 34.

Extending downwardly through the container 30 is a number of individual pulling elements 40 corresponding to the number of fuel rods 11 in the fuel rod assembly 10. The individual pulling elements are connected at their upper ends to a header device 41 which is, in turn, connected by a cable to a distantly located tensioning device 42 such as a tensioning reel or wrench for tensioning the entire group of pulling elements 40. The lengths of the pulling elements are sufficiently long so that they can be lowered by operation of the tensioning device to extend through the chamber 32 and enter, one each, into one of the tubes 24 within the transition funnel 20. Continued lowering of the pulling elements causes their ends to extend through the grid 23 at the bottom of the transition funnel 20 and thence into abutting, end-to-end positions with the fuel rods such that contact is made between the end of each pulling element and a fuel rod aligned therewith.

Figure 6:
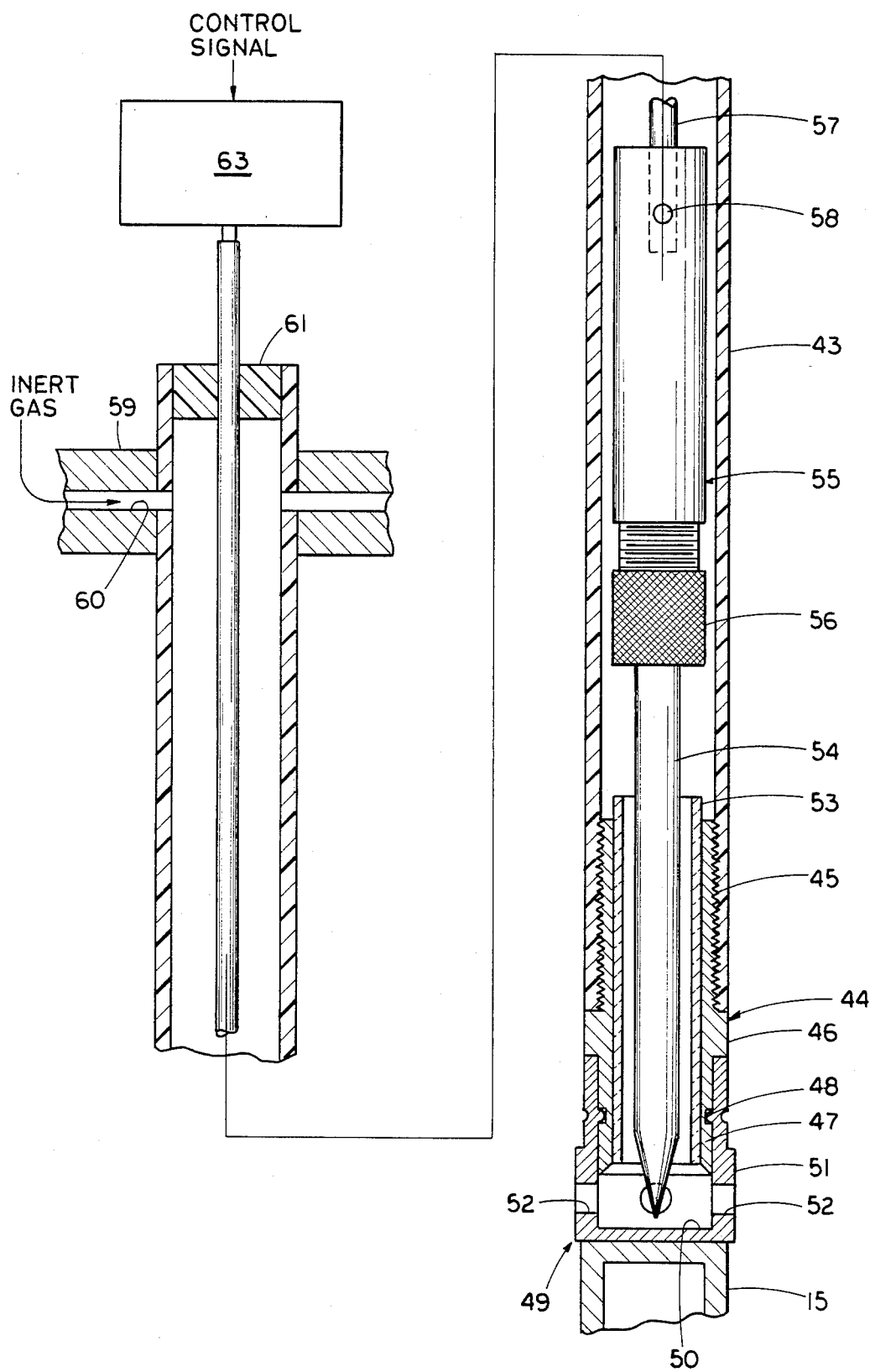
FIG. 6 is an elevational view in section through a welder at the lower end of an extractor tube for a fuel rod.

As shown in FIG. 6, the pulling elements each include a tube 43 comprised of plastic material. A tubular fitting 44 is provided with a threaded shank 45 for threaded engagement in the lower end of the tube. The threaded shank terminates at a torque-receiving section 46 which is constructed with a hexagonally-shaped outer wall for use to thread the shank 45 in the tube 43. Extending from the torque-receiving section 46 is a tubular holder 47 having an annular recess 48 in the outer wall surface about midway along the length of the annular wall. A cap 49 includes an end wall 50 integral with an annular wall 51 which can slide over the end portion of the tubular holder 47 and retained thereon by elastic deformation of the annular wall 51 so that a portion protrudes into the annular recess 48. The annular wall 51 of the cap near the end wall 50 is provided with radial openings 52 to permit a flow of an inert gas, e.g., argon, which is conducted by the tube 43 through an insulator sleeve 53 made of electrically insulative material such as glass into the cap at the end wall thereof where an arc is struck by electrical current delivered to an electrode 54. The electrode has a conical end which is spaced by a predetermined distance from the end wall 50 in the cap. The flow of inert gas prevents erosion, particularly oxidation, of the electrode which is made from metal, for example, tungsten. The electrode is connected to a holder 55 that includes a collet that is forced into engagement with the electrode by a sleeve 56 which is threaded onto the holder. Extending from the holder upwardly along the tube is a wire 57 for delivering electric current to the electrode. The gap which is established between the tip of the electrode and the cap is established by an anchor pin 58 preferably comprised of plastic or some other non-electrically conductive material through the side wall of the tube and into a suitable opening provided in the holder. Also shown in FIG. 6, at the upper end of the tube 43, there is a header 59 through which the upper ends of each tube 43 pass. Passageways 60 are formed in the header by drilling or other suitable operations. The passageways extend through the side wall of the tube for delivering the inert gas into the interior of the tube. The illustration in FIG. 6 is typical of the arrangement provided for the array of tubes. A plug 61 is fitted into the upper end of each of the tubes 43 to seal the end of the tubes so that the inert gas which is fed into the interior tube flows in a direction of the tube's length toward the electrode 54. The electrical wire 57 which extends from the electrode along the tube is passed through a suitable opening the plug 61 in a gas sealed manner. The end portion of the wire extending from the cap is connected to a suitable power supply 63 that is controlled so that electrical current is delivered to the electrode for a period of time sufficient to effect welding of the cap to a fuel rod. Preferably, the welder which is incorporated in the lower end of each tube 43 is a TIG welder which functions by striking an arc with the end wall 50 of the cap. The arc is submerged in the inert gas, e.g., argon, which is conducted by the tube to prevent erosion, particularly oxidation, of the electrode tip. The arc creates a pool of molten metal in the cap which welds the cap to the top of the fuel rod. The electrical current is delivered for about 4 to 6 seconds at about 80 amps to strike an arc is generated sufficient heat to weld the cap 49 to the top end 15 of a fuel rod. In FIG. 6, the top end 15 of the fuel rod is illustrated in a position which is suitable for carrying out the welding process.

The operator, employing remote control devices, controls the welders in the ends of each pulling element for welding a corresponding fuel rod upper end 15. After all of the caps on the ends of the pull elements have been welded to fuel rods, the tensioning device 42 is activated and the pull elements 40 are drawn upwardly through the transition funnel 20 and the chamber 32. Each of the fuel rods 11 is withdrawn from the fuel rod assembly 10 upwardly through an individual tube 24 and into an altered array, preferably an equilateral triangular array as shown in FIG. 5. The fuel rods 11 preferably are drawn at a rate such that their upper ends 15 enter into the chamber 32 concurrently whereby compacted nesting of the fuel rods 11 is readily achieved within the chamber 32. Because the fuel rods 11 are in tension, no Hertzian stresses are imposed on the rods during the consolidation process. Any preexisting bends in a rod can be removed by straightening the fuel rods as they pass through the tubes in chamber 32 even though a bent fuel rod has been embrittled due to irradiation. The tension on each fuel rod required for withdrawal is from about 20 to 200 pounds.

After the pulling elements 40 have been withdrawn to the top 33 of the container 30, the individual pulling elements are separated from the fuel rods 11. For this purpose, a guillotine shear can be arranged so that the shear blade is brought into contact with the weld sites between the cap and the fuel rod. Alternatively, the tubular fitting 44 can be pulled from the cap 49 whereby the latter will remain with the stored fuel rods. The chamber 32 is thereafter filled with fuel rods in a compact array.

The fuel rod assembly 10 no longer contains fuel rods 11 and can be withdrawn from the water pool for storage and ultimate disposal in an appropriate fashion. The container 30 is subsequently advanced to another fuel rod assembly along with the transition funnel 20. The pulling elements 40 are introduced through the alternate chamber 34 and the transition funnel 20. The process is repeated and the alternate chamber 34 is filled with fuel rods.

The container 30, holding fuel rods in a compacted array, can be stored under water in the water storage pool in the same type storage rack which formerly housed the fuel rod assembly 10. The storage capacity of a water storage pool can be nearly doubled by practicing this method.

The precise construction of the transition funnel 20 is such that the tubes 24 merge from the lower end 21 to the upper end 22. As the fuel rods are drawn upwardly through the tubes 24, the fuel rods cannot increase their rod-to-rod spacing but, instead, are merged into an ever-increasing density whereby the reactivity of the array is continuously reduced. Thus the possibility of developing a critical spacing of the fuel rods is precluded throughout the controlled densifying operation.

Although the invention has been shown in connection with a certain specific embodiment, it will be readily apparent to those skilled in the art that various changed in form and arrangement of parts may be made to suit requirements without departing from the spirit and scope of the invention.

I claim as my invention:

1. In a nuclear reactor system requiring periodic physical manipulation of spent fuel rods, the method of compacting fuel rods from a fuel rod assembly comprising the steps of:
   (1) removing the top end from said fuel rod assembly;
   (2) passing multiple fuel rod pulling members having electrodes of weld elements in leading ends thereof in sequence through a fuel rod container and thence through respective consolidating passages in a fuel-rod directing chamber;
   (3) welding said weld elements of said pulling members to the top end of respective said fuel rods corresponding to the respective pulling members;
   (4) drawing each of said pulling members axially to draw the respective engaged fuel rods in one axial direction through the respective said passages in said chamber to thereby consolidate said fuel rods into a compacted configuration of a cross-sectional area smaller than the cross-sectional area occupied thereby within said fuel rod assembly; and
   (5) drawing all of said engaged fuel rods concurrently and substantially parallel to one another to said one axial direction into said fuel rod container while maintaining said compacting configuration in a fuel rod density which is greater than that of the fuel rod density of said fuel rod assembly.

2. The method of claim 1 wherein the fuel rod density in the said fuel rod container is at least twice that of the fuel rod density in the said fuel rod assembly.

3. The method of claim 1 wherein each of the said pulling elements is connected to a common tensioning member.

4. The method of claim 1 wherein the said pulling elements are welded to the said fuel rods by inert arc welding of a cap member connected to the ends of the pulling elements.

5. The method of claim 1 wherein the said fuel rods are merged toward one another as they pass through the said fuel rod directing chamber.

6. A nuclear fuel rod pulling apparatus for pulling a nuclear fuel rod from a fuel rod assembly into a storage container, said apparatus including the combination of a pulling element extending along the direction of travel for the fuel rod,
   a weld cap carried on an extended end of the pulling element for welding to the fuel rod,
   an electrode carried by the pulling element for welding the cap to the fuel rod,
   said electrode is supported by said pulling element to form an air gap with said cap, and
   means for delivering an electrical current to said electrode to generate sufficient heat to weld the cap to the fuel rod.

7. The apparatus according to claim 6 further including means for delivering an inert gas to said weld cap for maintaining an electric arc established between said electrode and the cap submerged in the inert gas.

8. The apparatus according to claim 7 wherein said means for delivering inert gas includes a header connected to an end portion of said pulling element which is remote from said weld cap.

9. The apparatus according to claim 6 wherein said pulling element includes a tube, and a holder carried by said tube for supporting said weld cap.

10. The apparatus according to claim 6 wherein said means for delivering an electrical current includes a holder for supporting said electrode and an electrical conductor connected by said holder to said electrode while extending along said pulling element.

11. The apparatus according to claim 10 wherein said pulling element includes a tube.

* * * * *